(12) United States Patent
Shirai et al.

(10) Patent No.: US 11,506,411 B2
(45) Date of Patent: Nov. 22, 2022

(54) AIR-CONDITIONING DEVICE WITH REFRIGERANT LEAK DETECTION AND CONTROL

(71) Applicant: Mitsubishi Electric Corporation, Tokyo (JP)

(72) Inventors: Shota Shirai, Tokyo (JP); Kenshiro Kawabata, Tokyo (JP); Yuji Tarumi, Tokyo (JP); Kimitaka Kadowaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 142 days.

(21) Appl. No.: 17/051,288

(22) PCT Filed: Jun. 14, 2018

(86) PCT No.: PCT/JP2018/022787
§ 371 (c)(1),
(2) Date: Oct. 28, 2020

(87) PCT Pub. No.: WO2019/239556
PCT Pub. Date: Dec. 19, 2019

(65) Prior Publication Data
US 2021/0231329 A1 Jul. 29, 2021

(51) Int. Cl.
*F24F 11/36* (2018.01)
*F25B 13/00* (2006.01)
(Continued)

(52) U.S. Cl.
CPC ............ *F24F 11/36* (2018.01); *F25B 13/00* (2013.01); *F25B 41/00* (2013.01); *F25B 49/02* (2013.01);
(Continued)

(58) Field of Classification Search
CPC . F24F 11/36; F25B 2500/222; F25B 2500/07; F25B 2600/13; F25B 49/02
See application file for complete search history.

(56) References Cited

U.S. PATENT DOCUMENTS

2017/0227262 A1 8/2017 Suzuki et al.
2017/0292744 A1 10/2017 Suzuki et al.
(Continued)

FOREIGN PATENT DOCUMENTS

JP S59-109837 A 6/1984
JP 2001-208392 A 8/2001
(Continued)

OTHER PUBLICATIONS

International Search Report of the International Searching Authority dated Sep. 18, 2018 for the corresponding international application No. PCT/JP2018/022787 (and English translation).

*Primary Examiner* — Henry T Crenshaw
(74) *Attorney, Agent, or Firm* — Posz Law Group, PLC

(57) ABSTRACT

An air-conditioning device includes a refrigerant circuit including a compressor, a heat source-side heat exchanger, an expansion unit, and an intermediate heat exchanger connected by a refrigerant pipe, through which refrigerant circulates; and a heat medium circuit including a pump, the intermediate heat exchanger, and a load-side heat exchanger connected by a heat medium pipe, through which heat medium circulates. A discharge unit connected downstream of the intermediate heat exchanger in the heat medium circuit discharges fluid flowing through the heat medium pipe, depending on pressure of the fluid. A refrigerant concentration detector detects concentration of the refrigerant contained in the fluid discharged from the discharge unit. A notification device notifies leakage of the refrigerant. A
(Continued)

controller activates the notification device depending on the concentration of the refrigerant detected.

17 Claims, 4 Drawing Sheets

(51) Int. Cl.
  *F25B 41/00* (2021.01)
  *F25B 49/02* (2006.01)
(52) U.S. Cl.
  CPC ..... *F25B 2500/07* (2013.01); *F25B 2500/222* (2013.01); *F25B 2600/13* (2013.01)

(56) References Cited

U.S. PATENT DOCUMENTS

| | | | | |
|---|---|---|---|---|
| 2019/0346165 | A1* | 11/2019 | Obara | F24F 11/89 |
| 2019/0383511 | A1* | 12/2019 | Tomita | F24F 11/36 |
| 2019/0390876 | A1* | 12/2019 | Matsuda | F25B 49/02 |
| 2019/0390877 | A1* | 12/2019 | Sakae | F25B 1/00 |

FOREIGN PATENT DOCUMENTS

| | | | |
|---|---|---|---|
| JP | 2004-286255 | A | 10/2004 |
| JP | 2013-167395 | * | 8/2013 |
| JP | 2013-167395 | A | 8/2013 |
| JP | 2016-065674 | A | 4/2016 |
| WO | 2016/084128 | A1 | 6/2016 |

* cited by examiner

AIR-CONDITIONING DEVICE WITH REFRIGERANT LEAK DETECTION AND CONTROL

CROSS REFERENCE TO RELATED APPLICATIONS

This application is a U.S. national stage application of International Application No. PCT/JP2018/022787 filed on Jun. 14, 2018, the contents of which are incorporated herein by reference.

TECHNICAL FIELD

The present disclosure relates to an air-conditioning device that includes a heat exchanger exchanging heat between refrigerant and heat medium, and a refrigerant leakage detection device.

BACKGROUND ART

An air-conditioning device that uses pressure rise or volume expansion of gasified refrigerant to detect presence and absence of refrigerant leakage inside a heat exchanger has been proposed (see Patent Literature 1). In the air-conditioning device disclosed in Patent Literature 1, a heat exchanger internally including a refrigerant leakage detection device is disposed. Further, in the air-conditioning device disclosed in Patent Literature 1, a leakage detection groove is provided between a refrigerant circuit and a water circuit inside the heat exchanger, and leakage of the refrigerant is detected when the gasified refrigerant pushes out liquid in the leakage detection groove.

CITATION LIST

Patent Literature

Patent Literature 1: Japanese Unexamined Patent Application Publication No. 59-109837

SUMMARY OF INVENTION

Technical Problem

The heat exchanger disposed inside the air-conditioning device disclosed in Patent Literature 1 has a configuration in which, when the refrigerant leaks inside the heat exchanger, the liquid sealed in an outlet pipe is pushed out to a detection end because of volume expansion of the refrigerant, and electricity is thus conducted, to detect the refrigerant leakage. The air-conditioning device disclosed in Patent Literature 1 uses the heat exchanger that has a special structure including a leakage detection grooved pipe, and the refrigerant and water do not mix with each other. Therefore, when the air-conditioning device uses a heat exchanger exchanging heat between the refrigerant and heat medium, such as a plate heat exchanger, and the refrigerant flows into a heat medium circuit from the refrigerant circuit in the heat exchanger, inflow of the refrigerant cannot be early detected.

The present disclosure is made to solve the above-described issues, and to provide an air-conditioning device that includes a refrigerant circuit and a heat medium circuit, and makes it possible to early detect inflow of refrigerant from the refrigerant circuit to the heat medium circuit.

Solution to Problem

An air-conditioning device according to an embodiment of the present disclosure includes a refrigerant circuit including a compressor, a heat source-side heat exchanger, an expansion unit, and an intermediate heat exchanger that are connected by a refrigerant pipe, and through which refrigerant circulates, the heat source-side heat exchanger exchanging heat between air and the refrigerant, the intermediate heat exchanger exchanging heat between the refrigerant and heat medium; a heat medium circuit including a pump, the intermediate heat exchanger, and a load-side heat exchanger that are connected by a heat medium pipe, and through which the heat medium circulates, the load-side heat exchanger exchanging heat between air in an air-conditioned space and the heat medium; a discharge unit connected downstream of the intermediate heat exchanger in the heat medium circuit and configured to discharge fluid flowing through the heat medium pipe, to outside of the heat medium pipe, depending on pressure of the fluid; a refrigerant detection device configured to detect concentration of the refrigerant contained in the fluid discharged from the discharge unit; a notification device configured to notify leakage of the refrigerant; and a controller configured to activate the notification device depending on the concentration of the refrigerant detected by the refrigerant detection device.

Advantageous Effects of Invention

The air-conditioning device according to an embodiment of the present disclosure includes the discharge unit connected downstream of the intermediate heat exchanger in the heat medium circuit and configured to discharge the fluid flowing through the heat medium pipe, to the outside of the heat medium pipe, depending on the pressure of the fluid. The air-conditioning device further includes the refrigerant detection device configured to detect the concentration of the refrigerant contained in the fluid discharged from the discharge unit, the notification device configured to notify leakage of the refrigerant, and the controller configured to activate the notification device depending on the concentration of the refrigerant detected by the refrigerant detection device. When refrigerant leakage occurs, the air-conditioning device discharges the fluid to the outside from a portion located downstream of the intermediate heat exchanger in the heat medium circuit, and detects the refrigerant in a space to which the fluid is discharged. Accordingly, it is possible to early detect inflow of the refrigerant from the refrigerant circuit to the heat medium circuit.

DESCRIPTION OF EMBODIMENTS

An air-conditioning device 1 and an air-conditioning device 100 according to the present disclosure are described in detail below with reference to drawings. In the following drawings, dimensional relationship between components may be different from actual dimensional relationship. Further, in the following drawings, components denoted by the same reference signs are the components same as or equivalent to each other, and this is common throughout the entire text of the specification. Furthermore, a form of each of the components described throughout the entire text of the specification is merely illustrative, and the form of each of the components is not limited to the described form. To facilitate understanding, terms representing directions or positions (for example, "up", "down", "right", "left", "front", and "rear") are appropriately used. The representation, however, is merely used for convenience of the description, and do not limit arrangement and a direction of a device or a part.

Embodiment 1

Figure 1:
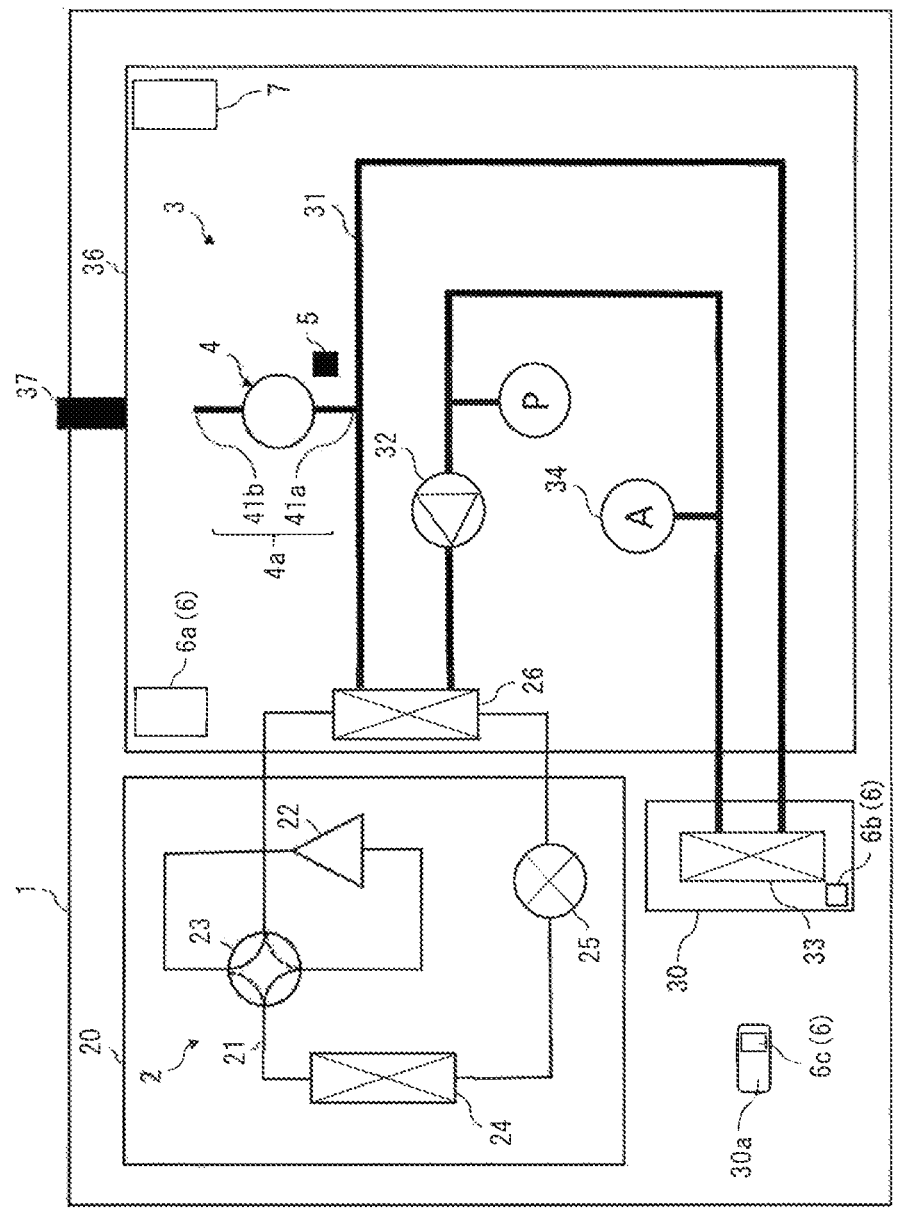
FIG. 1 a circuit diagram illustrating an air-conditioning device 1 according to Embodiment 1 of the present disclosure.

FIG. 1 is a circuit diagram illustrating the air-conditioning device 1 according to Embodiment 1 of the present disclosure. As illustrated in FIG. 1, the air-conditioning device 1 includes a refrigerant circuit 2, a heat medium circuit 3, a discharge unit 4, a refrigerant detection device 5, a notification device 6, and a controller 7, <Refrigerant Circuit 2>

The refrigerant circuit 2 includes a compressor 22, a heat source-side heat exchanger 24, an expansion unit 25, and an intermediate heat exchanger 26 that are connected by a refrigerant pipe 21, and refrigerant circulates through the refrigerant circuit 2. The heat source-side heat exchanger 24 exchanges heat between air and the refrigerant. The intermediate heat exchanger 26 exchanges heat between the refrigerant and a heat medium. The refrigerant circuit 2 may further include a flow switching device 23. The compressor 22, the flow switching device 23, the heat source-side heat exchanger 24, and the expansion unit 25 are disposed inside a heat source apparatus 20. The refrigerant flowing through the refrigerant circuit 2 is slightly flammable or flammable refrigerant. Examples of the refrigerant include R32 and propane. Further, a case where the air-conditioning device 1 is of an air-cooled air-conditioning device in which the heat source apparatus 20 is installed in an outdoor space is illustrated. The air-cooled air-conditioning device is an air-conditioning device in which the heat source-side heat exchanger 24 exchanges heat between the refrigerant and outdoor air.

(Compressor 22)

The compressor 22 is a device that suctions the refrigerant in a low-temperature low-pressure state, compresses the suctioned refrigerant, and discharges the refrigerant in a high-temperature high-pressure state. The compressor 22 is, for example, a rotary compressor, a scroll compressor, or a vane compressor. For example, the compressor 22 may be a compressor including an inverter having a controllable capacity.

(Flow Switching Device 23)

The flow switching device 23 is a device switching flows of the refrigerant in the refrigerant circuit 2, and is, for example, a four-way valve. The flow switching device 23 switches a flow path between a flow path (solid lines in FIG. 1) that causes the refrigerant discharged from the compressor 22 to flow through the intermediate heat exchanger 26 and a flow path (dashed lines in FIG. 1) that causes the refrigerant to flow through the heat source-side heat exchanger 24. The air-conditioning device 1 can perform any of heating operation and cooling operation through switching of the flow paths by the flow switching device 23. In a case where the air-conditioning device 1 performs only one of the heating operation and the cooling operation, the flow switching device 23 may be omitted.

(Heat Source-Side Heat Exchanger 24)

The heat source-side heat exchanger 24 is a device that is connected between the flow switching device 23 and the expansion unit 25, and exchanges heat between, for example, the outdoor air and the refrigerant. The heat source-side heat exchanger 24 is used as an evaporator during the heating operation, and is used as a condenser during the cooling operation. The heat source apparatus 20 may include a heat source-side fan that sends the outdoor air to the heat source-side heat exchanger 24.

(Expansion Unit 25)

The expansion unit 25 is a pressure reducing valve or an expansion valve that is connected between the heat source-side heat exchanger 24 and the intermediate heat exchanger 26 and decompresses and expands the refrigerant. The expansion unit 25 is, for example, an electronic expansion valve that has an adjustable opening degree.

<Heat Medium Circuit 3>

The heat medium circuit 3 includes a pump 32, the intermediate heat exchanger 26, and a load-side heat exchanger 33 that are connected by a heat medium pipe 31, and the heat medium circulates through the heat medium circuit 3. The load-side heat exchanger 33 exchanges heat between air in an air-conditioned space and the heat medium. The pump 32 and the intermediate heat exchanger 26 are disposed inside a hydro unit 36. The hydro unit 36 is a device that uses heat of the refrigerant flowing through the refrigerant circuit 2, to adjust temperature of the heat medium flowing through the heat medium circuit 3, and circulates the temperature-adjusted heat medium through the heat medium circuit 3. The heat medium circuit 3 is, for example, a water circuit, and the heat medium flowing through the heat medium circuit 3 may be, for example, water or brine. Further, the heat medium pipe 31 included the heat medium circuit 3 includes an air removal valve 34, and the hydro unit 36 includes an exhaust device 37.

(Pump 32)

The pump 32 is a device that is provided upstream of the intermediate heat exchanger 26 in the outdoor space and discharges the heat medium.

(Intermediate Heat Exchanger 26)

The intermediate heat exchanger 26 is connected between the expansion unit 25 and the flow switching device 23 in the refrigerant circuit 2, and is connected between the pump 32 and the load-side heat exchanger 33 in the heat medium circuit 3. The intermediate heat exchanger 26 is, for example, a plate heat exchanger. The intermediate heat exchanger 26 is a device that exchanges heat between the refrigerant flowing through the refrigerant circuit 2 and the heat medium flowing through the heat medium circuit 3. In the intermediate heat exchanger 26, the refrigerant and the heat medium may flow against each other or flow in parallel to each other.

(Load-Side Heat Exchanger 33)

The load-side heat exchanger 33 is a device that is provided downstream of the intermediate heat exchanger 26 in an indoor space and exchanges heat between, for example, indoor air and the heat medium. The load-side heat exchanger 33 is used as a condenser during the heating operation, and is used as an evaporator during the cooling operation. The load-side heat exchanger 33 is incorporated in a heating and cooling apparatus 30, and the heating operation or the cooling operation of the heating and cooling apparatus 30 is performed through heat exchange by the load-side heat exchanger 33. In this example, the indoor space is a living space of a house, an indoor public space, and other spaces. The indoor space in the description of the air-conditioning device 1 according to Embodiment 1 is an air-conditioned space.

(Air Removal Valve 34)

The air removal valve 34 is a valve that is provided downstream of the load-side heat exchanger 33 and purges the air mixed into the heat medium flowing through the heat medium circuit 3.

(Exhaust Device 37)

The exhaust device 37 connects the inside of the hydro unit 36 and the outdoor space, and exhausts or suctions the air to discharge the gas inside the hydro unit 36 from the hydro unit 36 to the outdoor space without through the indoor space. Accordingly, the exhaust device 37 discharges the fluid discharged from the discharge unit 4 described below, from the inside of the hydro unit 36 in which the pump 32 and the intermediate heat exchanger 26 are disposed, to the outdoor space. The exhaust device 37 is, for example, an exhaust duct. In a case where the hydro unit 36 is installed in the outdoor space, the exhaust device 37 may be omitted, <Discharge Unit>

The discharge unit 4 is connected downstream of the intermediate heat exchanger 26 in the heat medium circuit 3, and discharges the fluid flowing through the heat medium pipe 31 to the outside of the heat medium pipe 31, depending on pressure of the fluid. The discharge unit 4 is provided to the heat medium pipe 31 through which the heat medium flowing out from the intermediate heat exchanger 26 before flowing into the load-side heat exchanger 33 flows, and is provided outside the air-conditioned space. When the pressure of the heat medium inside the heat medium pipe 31 reaches prescribed pressure, the discharge unit 4 discharges a part of the heat medium to the outside of the heat medium pipe 31. The discharge unit 4 includes, for example, a pressure relief valve. In the air-conditioning device 1 of Embodiment 1, the discharge unit 4 is provided outside the intermediate heat exchanger 26. Therefore, it is unnecessary to use a heat exchanger having a mechanism of the discharge unit 4 as the intermediate heat exchanger 26, and the existing intermediate heat exchanger 26 can be used. Further, as the discharge unit 4 can be disposed at a position separated from the intermediate heat exchanger 26, for example, the discharge unit 4 can be disposed at a position as high as possible. In this case, as the gas is lighter than the heat medium, effect to discharge the gas by the discharge unit 4 is enhanced.

The discharge unit 4 includes a pipe-shaped main body portion 4a. The main body portion 4a includes a connection end part 41a provided with a connection port directly or indirectly connected to the heat medium pipe 31. The connection end part 41a is disposed at a position higher than or equal to the heat medium pipe 31 in the vertical direction. The main body portion 4a includes an ejection end part 41b provided with an ejection port through which the fluid is ejected to the outside of the heat medium pipe 31 when the pressure in the heat medium pipe 31 is higher than or equal to the prescribed pressure. The ejection end part 41b is disposed at a position higher than or equal to the connection end part 41a in the vertical direction.

A case where the intermediate heat exchanger 26 is damaged by freezing, for example, is described. In the case where the intermediate heat exchanger 26 is damaged, the refrigerant flowing through the refrigerant circuit 2 may enter the flow path of the heat medium in the intermediate heat exchanger 26, and may flow into the heat medium circuit 3. In this case, the refrigerant flowing into the heat medium circuit 3 is vaporized at a certain degree by the heat medium flowing through the heat medium circuit 3. This is, in short, caused by the fact that a boiling point of the refrigerant is lower than a boiling point of the heat medium.

The discharge unit 4 of the air-conditioning device 1 according to Embodiment 1 opens when receiving pressure of 1.45 [MPa] or more from the inside, and discharges the fluid inside the heat medium pipe 31 to the outside. The heat medium normally generates pressure of 1.0 [MPa], whereas the refrigerant generates pressure of 4.0 [MPa] or more. When the refrigerant leaks to a portion of the heat medium pipe 31 that is inside the intermediate heat exchanger 26, the pressure inside the heat medium pipe 31 partially becomes 4.0 [MPa] or more. The pressure inside the heat medium pipe 31 is increased by the refrigerant flowing into the heat medium pipe 31, and the fluid, namely, the heat medium and the refrigerant are discharged from the discharge unit 4. The air-conditioning device 1 discharges, from the discharge unit 4, the gas based on the refrigerant flowing into the heat medium pipe 31, thereby preventing the gas from circulating into the load-side heat exchanger 33.

<Refrigerant Detection Device 5>

The refrigerant detection device 5 detects concentration of the refrigerant contained in the fluid discharged from the discharge unit 4. The refrigerant detection device 5 is installed above or below the discharge unit 4 depending on specific gravity, to the air, of the refrigerant used in the heat source apparatus 20 of the air-cooled air-conditioning device. In a case where the refrigerant used in the heat source apparatus 20 is lighter than the air, the refrigerant detection device 5 is installed above the discharge unit 4, More specifically, in the case where the refrigerant used in the heat source apparatus 20 is lighter than the air, the refrigerant detection device 5 is disposed at a position higher than the ejection end part 41b of the discharge unit 4 in the vertical direction. In a case where the refrigerant used in the heat source apparatus 20 is heavier than the air, the refrigerant detection device 5 is installed below the discharge unit 4, More specifically, in the case where the refrigerant used in the heat source apparatus 20 is heavier than the air, the refrigerant detection device 5 is disposed at a position lower than the ejection end part 41b in the vertical direction. In the air-conditioning device 1 according to Embodiment 1, the refrigerant detection device 5 is installed below the discharge unit 4 as the refrigerant used in the heat source apparatus 20 is heavier than the air.

<Notification Device 6>

The notification device 6 notifies leakage of the refrigerant depending on the refrigerant concentration detected by the refrigerant detection device 5 and in accordance with an instruction from the controller 7 described below. The notification device 6 includes a first notification device 6a, a second notification device 6b, and a third notification device 6c. The first notification device 6a is housed inside the hydro unit 36 in which the pump 32 and the intermediate heat exchanger 26 are disposed. In a case where the refrigerant detection device 5 detects the refrigerant of prescribed concentration or more, the first notification device 6a generates sound from the hydro unit 36, and notifies people around of the refrigerant leakage, in accordance with an instruction from the controller 7. The sound generated from the first notification device 6a housed in the hydro unit 36 is set in intensity depending on, for example, the concentration of the leaking refrigerant. A user can recognize an audible range of the sound generated from the first notification device 6a as a range where fire cannot be carried in. This makes it possible to prevent a fire source from being carried in the space in which the refrigerant leaks.

The second notification device 6b is housed inside the heating and cooling apparatus 30 in which the load-side heat exchanger 33 is disposed. In the case where the refrigerant detection device 5 detects the refrigerant of the prescribed concentration or more, the second notification device 6b generates sound from the heating and cooling apparatus 30, and notifies people around of the refrigerant leakage. Alternatively, notification by the notification device 6 may be notification recognized by vision of the user. For example, the notification device 6 may be provided as a warning lamp in the hydro unit 36 or the heating and cooling apparatus 30 and notify people around of the refrigerant leakage by light.

The third notification device 6c may be provided inside a remote control 30a that controls the heating and cooling apparatus 30. In this case, the third notification device 6c can notify the refrigerant leakage by display. The controller 7 displays a warning on a control panel used as the third notification device 6c in the remote control 30a, thereby prompting the user of the air-conditioning device 1 to perform appropriate action to the refrigerant leakage. As the notification device 6, any one or two or more of the first notification device 6a, the second notification device 6b, and the third notification device 6c may be provided in the air-conditioning device 1.

<Controller 7>

Figure 2:
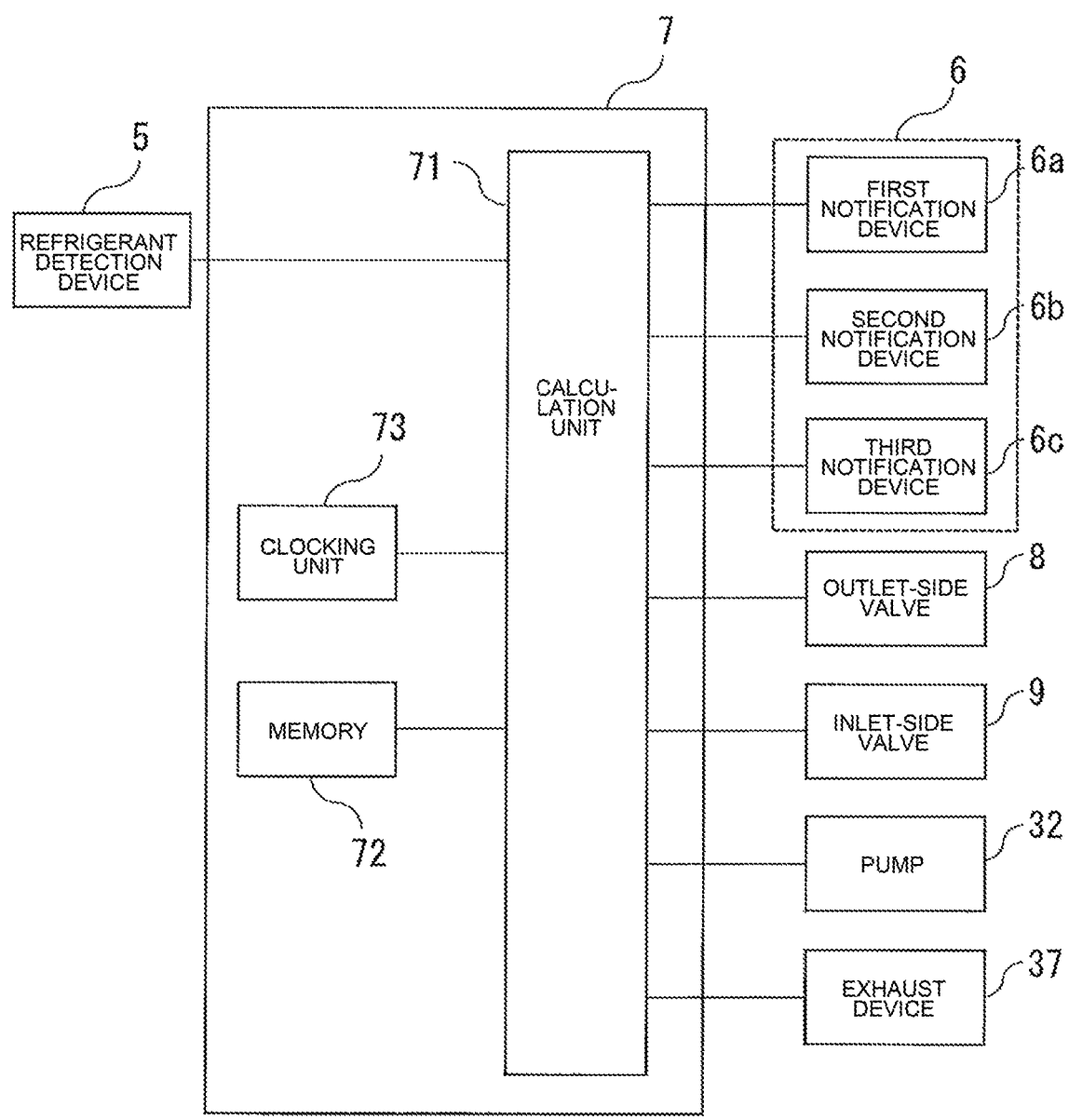
FIG. 2 is a block diagram of a controller of the air-conditioning device 1 according to Embodiment 1 of the present disclosure.

FIG. 2 is a block diagram illustrating the controller 7 of the air-conditioning device 1 according to Embodiment 1 of the present disclosure. The controller 7 communicates with the refrigerant detection device 5, and acquires the refrigerant concentration. In addition, the controller 7 controls the notification device 6, an outlet-side valve 8, an inlet-side valve 9, the pump 32, and the exhaust device 37 depending on the refrigerant concentration detected by the refrigerant detection device 5. The controller 7 includes a calculation unit 71, a memory 72, and a clocking unit 73. The calculation unit 71 is, for example, dedicated hardware or a central processing unit (CPU) executing a program stored in the memory 72. The calculation unit 71 performs calculation on the basis of data stored in the memory 72 and the refrigerant concentration detected by the refrigerant detection device 5, thereby determining leakage of the refrigerant. As the memory 72, a nonvolatile or volatile storage device such as a RAM, a ROM, a flash memory, an EPROM, and an EEPROM may be used. The memory 72 stores various kinds of data to be read out by the calculation unit 71, or stores a result of the calculation by the calculation unit 71. The clocking unit 73 is, for example, a timer or a real-time clock, and counts a current time and other times. Note that, in FIG. 1, the controller 7 is disposed inside the hydro unit 36; however, the controller 7 may be disposed inside the heat source apparatus 20 or the heating and cooling apparatus 30.

The controller 7 activates the notification device 6 depending on the refrigerant concentration detected by the refrigerant detection device 5. When the refrigerant concentration in the space around the refrigerant detection device 5 becomes a threshold or more, the controller 7 activates the notification device 6, stops the pump 32, or activates the exhaust device 37. Various kinds of thresholds of the refrigerant concentration detected by the refrigerant detection device 5 are set in consideration of concentration causing ignition of the slightly flammable or flammable refrigerant, and a volume of the hydro unit 36. In addition, the thresholds may be set depending on horsepower of the pump 32.

More specifically, in a case where the refrigerant concentration detected by the refrigerant detection device 5 exceeds a unit-side set value that is a preset threshold of the refrigerant concentration, the controller 7 determines that notification of the refrigerant leakage is necessary. Further, the controller 7 controls the first notification device 6a such that the first notification device 6a notifies the refrigerant leakage. The controller 7 causes the first notification device 6a to generate, for example, sound having intensity audible within the range where fire is strictly prohibited. Further, in a case where the refrigerant concentration detected by the refrigerant detection device 5 exceeds an apparatus-side set value that is a preset threshold of the refrigerant concentration, the controller 7 controls the second notification device 6b such that the second notification device 6b notifies people in the air-conditioned space of the refrigerant leakage. Alternatively, in a case where the refrigerant concentration detected by the refrigerant detection device 5 exceeds the apparatus-side set value, which is a preset threshold of the refrigerant concentration, the controller 7 controls the third notification device 6c such that the third notification device 6c notifies people in the air-conditioned space of the refrigerant leakage. Moreover, in a case where the refrigerant concentration detected by the refrigerant detection device 5 exceeds a discharge set value that is a preset threshold of the refrigerant concentration, the controller 7 activates the exhaust device 37. Note that the unit-side set value, the apparatus-side set value, and the discharge set value may be equal to one another or different from one another. The unit-side set value, the apparatus-side set value, and the discharge set value are stored as the thresholds in the memory 72. The calculation unit 71 of the controller 7 refers to the refrigerant concentration detected by the refrigerant detection device 5 and one of the unit-side set value and the apparatus-side set value stored in the memory 72, to determine whether the refrigerant concentration detected by the refrigerant detection device 5 exceeds the unit-side set value or the apparatus-side set value. Further, the calculation unit 71 of the controller 7 refers to the refrigerant concentration detected by the refrigerant detection device 5 and the discharge set value stored in the memory 72, to determine whether the refrigerant concentration detected by the refrigerant detection device 5 exceeds the discharge set value.

Figure 3:
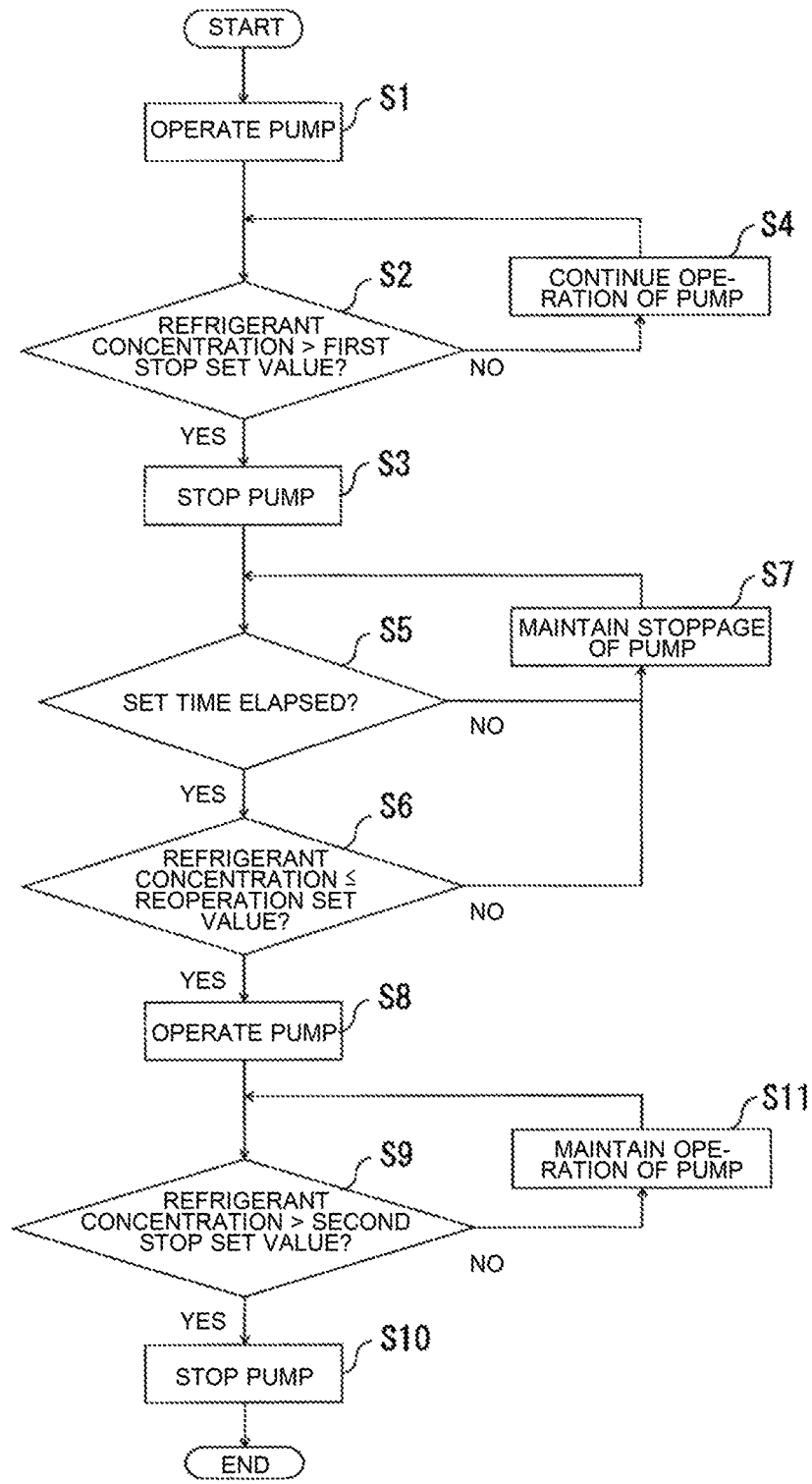
FIG. 3 is a flowchart through which the controller controls a pump in FIG. 1.

FIG. 3 is a flowchart through which the controller 7 controls the pump 32 in FIG. 1. The control of the pump 32 exercised by the controller 7 is described below. In operation of the air-conditioning device 1, the pump 32 is operated (step S1). In a case where the refrigerant flows into the heat medium circuit 3, it is necessary for the controller 7 to stop the pump 32 to close the heat medium circuit 3. The calculation unit 71 of the controller 7 refers to the refrigerant concentration detected by the refrigerant detection device 5 and a first stop set value stored in the memory 72, to determine whether the refrigerant concentration detected by the refrigerant detection device 5 exceeds the first stop set value (step S2). In a case where the calculation unit 71 of the controller 7 determines that the refrigerant concentration detected by the refrigerant detection device 5 exceeds the first stop set value, which is a preset threshold of the refrigerant concentration, the pump 32 is stopped (step S3). In a case where the calculation unit 71 of the controller 7 determines that the refrigerant concentration detected by the refrigerant detection device 5 does not exceed the first stop set value, which is a preset threshold of the refrigerant concentration, the operation of the pump 32 is continued (step S4).

In a case where the hydro unit 36 is installed in a place in which temperature reaches a point below the freezing point, however, the heat medium pipe 31 of the heat medium circuit 3 may be ruptured because of freezing of the heat medium caused by stoppage of the pump 32. Therefore, when the refrigerant concentration detected by the refrigerant detection device 5 is concentration not causing fire, the controller 7 operates the pump 32 again and exercise control hardly causing rupture of the heat medium pipe 31 due to freezing. The calculation unit 71 of the controller 7 refers to the refrigerant concentration detected by the refrigerant detection device 5 and a reoperation set value stored in the memory 72. Further, the calculation unit 71 of the controller 7 determines whether a set time stored in the memory 72 has elapsed on the basis of the set time and a time acquired from the clocking unit 73 (step S5). When the calculation unit 71 of the controller 7 determines that the set time has elapsed, the calculation unit 71 of the controller 7 then determines whether the refrigerant concentration detected by the refrigerant detection device 5 is lower than or equal to the reoperation set value (step S6). In a case where the calculation unit 71 of the controller 7 determines that the refrigerant concentration is lower than or equal to the reoperation set value after the set time has elapsed, the pump 32 is operated again (step S8). In other words, in a case where, after the set time has elapsed, the refrigerant concentration detected by the refrigerant detection device 5 is lower than or equal to the reoperation set value, which is preset threshold of the refrigerant concentration, the controller 7 activates the stopped pump 32. Note that the reoperation set value is a value of the concentration not causing ignition of the used refrigerant. In a case where the calculation unit 71 of the controller 7 determines that the set time has not elapsed in step S5 or determines that the refrigerant concentration exceeds the reoperation set value in step S6, the stoppage of the pump 32 is maintained (step S7).

The calculation unit 71 of the controller 7 refers to the refrigerant concentration detected by the refrigerant detection device 5 and a second stop set value stored in the memory 72, to determine whether the refrigerant concentration detected by the refrigerant detection device 5 exceeds the second stop set value (step S9). In a case where the calculation unit 71 of the controller 7 determines that the refrigerant concentration detected by the refrigerant detection device 5 exceeds the second stop set value, which is a preset threshold of the refrigerant concentration, the pump 32 is stopped (step S10). In a case where the calculation unit 71 of the controller 7 determines that the refrigerant concentration detected by the refrigerant detection device 5 does not exceed the second stop set value, which is a preset threshold of the refrigerant concentration, the operation of the pump 32 is continued (step S11). Note that the second stop set value is a value of concentration that may cause ignition of the used refrigerant. The first stop set value, the reoperation set value, and the second stop set value, which relate to the control of the pump 32, are increased in this order. The first stop set value, the reoperation set value, and the second stop set value are stored as the thresholds in the memory 72.

(Flow of Refrigerant and Flow of Heat Medium)

Next, a flow of the refrigerant and a flow of the heat medium in the air-conditioning device 1 are described. The air-conditioning device 1 includes, as operation modes, a heating operation mode and a cooling operation mode. The flow of the refrigerant and the flow of the heat medium in each of the heating operation mode and the cooling operation mode are described with reference to FIG. 1.

(Flow of Refrigerant in Heating Operation)

First, the flow of the refrigerant in the heating operation is described. In the heating operation, a discharge port of the compressor 22 and the intermediate heat exchanger 26 are connected by the flow switching device 23, and a suction port of the compressor 22 and the heat source-side heat exchanger 24 are connected by the flow switching device 23 (solid lines in FIG. 1). In the heating operation, the refrigerant suctioned into the compressor 22 is compressed by the compressor 22, and the refrigerant in a high-temperature high-pressure gas state is discharged from the compressor 22. The refrigerant in the high-temperature high-pressure gas state discharged from the compressor 22 passes through the flow switching device 23, and then flows into the intermediate heat exchanger 26 used as a condenser. The refrigerant flowing into the intermediate heat exchanger 26 exchanges heat with the heat medium flowing through the heat medium circuit 3, and is condensed and liquefied. At this time, the heat medium flowing through the heat medium circuit 3 is heated. The refrigerant in the condensed liquid state is expanded and decompressed by the expansion unit 25, into the refrigerant in a low-temperature low-pressure two-phase gas-liquid state, Subsequently, the refrigerant in the two-phase gas-liquid state flows into the heat source-side heat exchanger 24 used as an evaporator, exchanges heat with, for example, the outdoor air in the heat source-side heat exchanger 24, and is accordingly evaporated and gasified. The refrigerant in an evaporated low-temperature low-pressure gas state passes through the flow switching device 23 and is suctioned into the compressor 22.

(Flow of Heat Medium in Heating Operation)

Next, the flow of the heat medium in the heating operation is described. The heat medium discharged by the pump 32 flows into the intermediate heat exchanger 26. The heat medium flowing into the intermediate heat exchanger 26 exchanges heat with the refrigerant flowing through the refrigerant circuit 2, and is heated. The heated heat medium goes across the discharge unit 4, flows into the load-side heat exchanger 33 provided in the indoor space, exchanges heat with, for example, the indoor air in the load-side heat exchanger 33, and is cooled. At this time, the indoor air is heated to heat the indoor space. The cooled heat medium is then suctioned into the pump 32.

(Flow of Refrigerant in Cooling Operation)

Next, the flow of the refrigerant in the cooling operation is described. In the cooling operation, the discharge port of the compressor 22 and the heat source-side heat exchanger 24 are connected by the flow switching device 23, and the suction port of the compressor 22 and the intermediate heat exchanger 26 are connected by the flow switching device 23 (dashed lines in FIG. 1). In the cooling operation, the refrigerant suctioned into the compressor 22 is compressed by the compressor 22, and the refrigerant in the high-temperature high-pressure gas state is discharged from the compressor 22. The refrigerant in the high-temperature high-pressure gas state discharged from the compressor 22 passes through the flow switching device 23, and flows into the heat source-side heat exchanger 24 used as a condenser. The refrigerant flowing into the heat source-side heat exchanger 24 exchanges heat with, for example, the outdoor air, and is condensed and liquefied. The refrigerant in the condensed liquid state is expanded and decompressed by the expansion unit 25, into the refrigerant in the low-temperature low-pressure two-phase gas-liquid state. Subsequently, the refrigerant in the two-phase gas-liquid state flows into the intermediate heat exchanger 26 used as an evaporator. In the intermediate heat exchanger 26, the refrigerant exchanges heat with the heat medium flowing through the heat medium circuit 3, and is evaporated and gasified. At this time, the heat medium flowing through the heat medium circuit 3 is cooled. The refrigerant in the evaporated low-temperature low-pressure gas state passes through the flow switching device 23 and is suctioned into the compressor 22.
(Flow of Heat Medium in Cooling Operation)

Next, the flow of the heat medium in the cooling operation is described. The heat medium discharged by the pump 32 flows into the intermediate heat exchanger 26. The heat medium flowing into the intermediate heat exchanger 26 exchanges heat with the refrigerant flowing through the refrigerant circuit 2 and is cooled. The cooled heat medium goes across the discharge unit 4, flows into the load-side heat exchanger 33 provided in the indoor space, exchanges heat with, for example, the indoor air in the load-side heat exchanger 33, and is heated. At this time, the indoor air is cooled to cool the indoor space. The heated heat medium is then suctioned into the pump 32.
(Potential Position from which Refrigerant May Leak into Heat Medium Pipe)

In the heating operation and the cooling operation, the refrigerant inevitably passes through the intermediate heat exchanger 26 for the refrigerant to leak into the heat medium pipe 31 as the flow of the refrigerant and the flow of the heat medium are as described above. Accordingly, to early discharge the refrigerant leaking into the heat medium pipe 31, the discharge unit 4 is desirably installed close to the intermediate heat exchanger 26. In a case where the refrigerant leaks at a position other than the intermediate heat exchanger 26, the refrigerant is discharged to a space around the refrigerant circuit 2.
(Operation at Inflow of Refrigerant)

Next, the operation of the air-conditioning device 1 in a case where the refrigerant flows into the heat medium circuit 3 is described. A case where the intermediate heat exchanger 26 is damaged by freezing, for example, is described. In the case where the intermediate heat exchanger 26 is damaged, the refrigerant may enter the flow path of the heat medium in the intermediate heat exchanger 26, and may flow into the heat medium circuit 3.

The refrigerant flowing into the heat medium circuit 3 passes through the heat medium pipe 31 from the intermediate heat exchanger 26, and reaches the discharge unit 4. The gasified refrigerant easily flows into the discharge unit 4 as the ejection end part 41b of the discharge unit 4 is directed upward in the vertical direction. The pressure of the refrigerant inside the intermediate heat exchanger 26 is greater than the pressure of the heat medium inside the heat medium circuit 3. Accordingly, when the refrigerant flows into the discharge unit 4, the discharge unit 4 immediately opens, and the refrigerant is discharged from the ejection end part 41b to the outside of the heat medium pipe 31 along with the heat medium. When the refrigerant is discharged from the ejection end part 41b of the discharge unit 4, the refrigerant is detected by the refrigerant detection device 5 disposed close to the ejection end part 41b. When the refrigerant is detected by the refrigerant detection device 5, the controller 7 determines whether the refrigerant concentration exceeds the threshold. In the case where the refrigerant concentration exceeds the threshold, the notification device 6 provided in the hydro unit 36 or the heating and cooling apparatus 30 generates sound to notify people around of the refrigerant leakage.

The slightly flammable or flammable refrigerant discharged into the hydro unit 36 is discharged by the exhaust device 37 from the hydro unit 36 to the outside to prevent the concentration from reaching the concentration causing ignition inside the hydro unit 36. In other words, the exhaust device 37 discharges the refrigerant from the hydro unit 36 to the outside to prevent the refrigerant detected by the refrigerant detection device 5 from reaching the prescribed concentration.

As described above, the air-conditioning device 1 includes the discharge unit 4, which is connected downstream of the intermediate heat exchanger 26 in the heat medium circuit 3 and discharges the fluid flowing through the heat medium pipe 31 to the outside of the heat medium pipe 31, depending on the pressure of the fluid. Further, the air-conditioning device 1 includes the refrigerant detection device 5, which detects the concentration of the refrigerant contained in the fluid discharged from the discharge unit 4, the notification device 6, which notifies the leakage of the refrigerant, and the controller 7, which activates the notification device 6 depending on the refrigerant concentration detected by the refrigerant detection device 5. When the refrigerant leakage occurs, the air-conditioning device 1 discharges the fluid to the outside from a portion located downstream of the intermediate heat exchanger 26 in the heat medium circuit 3, and detects the refrigerant in a space to which the fluid is discharged. Accordingly, it is possible to early detect the inflow of the refrigerant from the refrigerant circuit 2 to the heat medium circuit 3.

Further, the air-conditioning device 1 includes the discharge unit 4, which is connected downstream of the intermediate heat exchanger 26 in the heat medium circuit 3 and discharges the fluid flowing through the heat medium pipe 31 to the outside of the heat medium pipe 31, depending on the pressure of the fluid. Further, the air-conditioning device 1 includes the refrigerant detection device 5, which detects the concentration of the refrigerant contained in the fluid discharged from the discharge unit 4, the notification device 6, which notifies the leakage of the refrigerant, and the controller 7, which activates the notification device 6 depending on the refrigerant concentration detected by the refrigerant detection device 5. When the refrigerant leakage occurs, the air-conditioning device 1 discharges the fluid to the outside from a portion located downstream of the intermediate heat exchanger 26 in the heat medium circuit 3, and detects the refrigerant in the space to which the fluid is discharged. Accordingly, even in the case where the air-conditioning device 1 uses the slightly flammable or flammable refrigerant, it is possible to early detect the inflow of the refrigerant to the heat medium circuit 3. As a result, as the air-conditioning device 1 can early detect the leaking refrigerant, it is possible to prevent the slightly flammable or flammable refrigerant from flowing into the indoor space.

In addition, the discharge unit 4 includes the pipe-shaped main body portion 4a, and the main body portion 4a includes the connection end part 41a that is disposed at the position higher than or equal to the heat medium pipe 31 in the vertical direction and is provided with the connection port connected to the heat medium pipe 31. Further, the main body portion 4a includes the ejection end part 41b that is disposed at the position higher than or equal to the connection end part 41a in the vertical direction and is provided with the ejection port through which the fluid is ejected to the outside of the heat medium pipe 31 when the pressure in the heat medium pipe 31 is higher than or equal to the prescribed pressure. As the connection end part 41a is disposed at the position higher than or equal to the heat medium pipe 31 and the ejection end part 41b is disposed at the position higher than or equal to the connection end part 41a, the gas based on the refrigerant is easily ejected from the heat medium pipe 31, and it is thus possible to early detect the refrigerant flowing into the heat medium circuit 3.

An existing air-conditioning device detects the refrigerant leakage on the basis of pressure rise in the outlet pipe. Therefore, when a plurality of existing air-conditioning devices are coupled and used, pressure loss inside the heat medium circuit is largely varied depending on the operation state of each of the existing air-conditioning devices. Therefore, each of the existing air-conditioning devices may erroneously detect the refrigerant leakage. In contrast, when the refrigerant leakage occurs, the air-conditioning device 1 discharges the fluid to the outside from a portion located downstream of the intermediate heat exchanger 26 in the heat medium circuit 3, and detects the refrigerant in the space to which the fluid is discharged. Accordingly, the air-conditioning device 1 does not erroneously detect the refrigerant leakage.

In the case where the refrigerant is lighter than the air, the refrigerant detection device 5 is disposed at the position higher than the ejection end part 41b in the vertical direction. In contrast, in the case where the refrigerant is heavier than the air, the refrigerant detection device 5 is disposed at the position lower than the ejection end part 41b in the vertical direction. As the refrigerant detection device 5 is disposed at the position toward which the refrigerant easily moves, depending on the weight of the refrigerant compared to the weight of the air, it is possible to early detect the refrigerant discharged from the discharge unit 4.

The air-conditioning device 1 further includes the exhaust device 37, which discharges the fluid discharged from the discharge unit 4, from the hydro unit 36 in which the pump 32 and the intermediate heat exchanger 26 are disposed, to the outdoor space. Further, in the case where the refrigerant concentration detected by the refrigerant detection device 5 exceeds the discharge set value, which is a preset threshold of the refrigerant concentration, the controller 7 activates the exhaust device 37. Accordingly, the air-conditioning device 1 uses the exhaust device 37 to discharge the refrigerant to the outside without accumulating the refrigerant in the hydro unit 36. This makes it possible to prevent the slightly flammable or flammable refrigerant from flowing into the indoor space, and to prevent serious accidents such as fires.

The notification device 6 includes the first notification device 6a inside the hydro unit 36 in which the pump 32 and the intermediate heat exchanger 26 are disposed. In the case where the refrigerant concentration detected by the refrigerant detection device 5 exceeds the unit-side set value, which is a preset threshold of the refrigerant concentration, the controller 7 controls the first notification device 6a such that the first notification device 6a notifies the refrigerant leakage. As a result, the user can recognize an audible range of the sound generated from the first notification device 6a as a range where fire cannot be carried in. This makes it possible to prevent a fire source from being carried in the space in which the refrigerant leaks.

The notification device 6 further includes the second notification device 6b inside the heating and cooling apparatus 30 in which the load-side heat exchanger 33 is disposed. In the case where the refrigerant concentration detected by the refrigerant detection device 5 exceeds the apparatus-side set value, which is a preset threshold of the refrigerant concentration, the controller 7 controls the second notification device 6b such that the second notification device 6b notifies people in the air-conditioned space of the refrigerant leakage. Accordingly, even in the case where the user is in the indoor air-conditioned space separated from the hydro unit 36, the user can early recognize the inflow of the refrigerant to the heat medium circuit.

In the case where, after the set time has elapsed, the refrigerant concentration detected by the refrigerant detection device 5 is lower than or equal to the reoperation set value, which is preset threshold of the refrigerant concentration, the controller 7 activates the stopped pump 32. Accordingly, for example, in the case where the hydro unit 36 is installed in a place in which temperature reaches a point below the freezing point, the air-conditioning device 1 can prevent the heat medium pipe 31 of the heat medium circuit 3 from being ruptured because of freezing of the heat medium caused by stoppage of the pump 32. Further, the controller 7 controls the pump 32 through comparing the refrigerant concentration detected by the refrigerant detection device 5 with the first stop set value, the reoperation set value, and the second stop set value, which are preset thresholds of the refrigerant concentration. Accordingly, even in the case where the slightly flammable or flammable refrigerant is used, it is possible to early detect the inflow of the refrigerant to the heat medium circuit 3, and to prevent the heat medium pipe 31 of the heat medium circuit 3 from being ruptured because of freezing.

Embodiment 2

Figure 4:
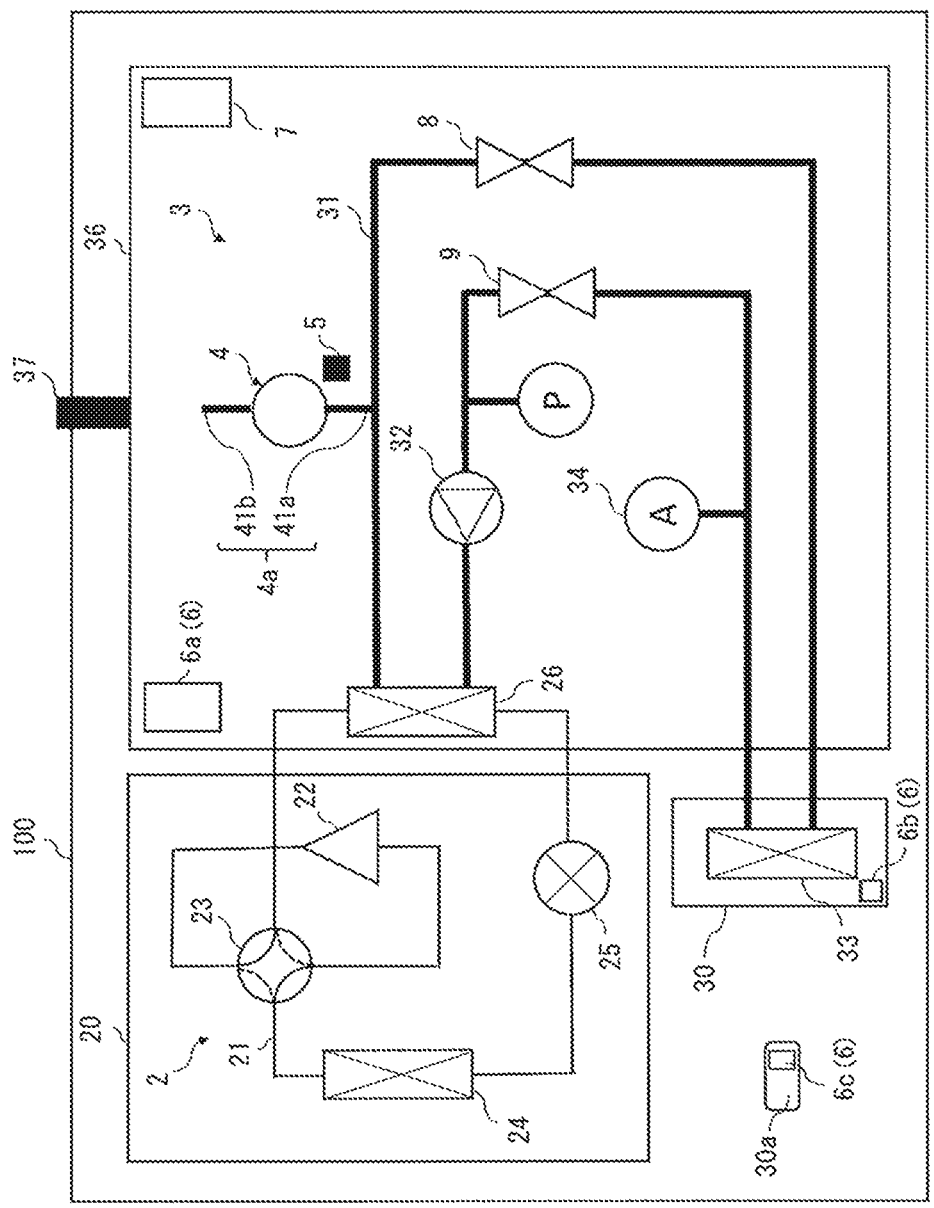
FIG. 4 is a circuit diagram illustrating an air-conditioning device 100 according to Embodiment 2 of the present disclosure.

FIG. 4 is a circuit diagram illustrating an air-conditioning device 100 according to Embodiment 2 of the present disclosure. The air-conditioning device 100 according to Embodiment 2 is different from the air-conditioning device 1 according to Embodiment 1 in that the air-conditioning device 100 includes the outlet-side valve 8 and the inlet-side valve 9. In the description of the air-conditioning device 100 according to Embodiment 2, the parts same as the parts of the air-conditioning device 1 according to Embodiment 1 are denoted by the same reference signs, and descriptions of the parts are omitted and differences with the air-conditioning device 1 according to Embodiment 1 are mainly described.

As illustrated in FIG. 4, the heat medium circuit 3 of the air-conditioning device 100 includes the outlet-side valve 8 and the inlet-side valve 9. The outlet-side valve 8 is a valve that is provided to an outlet port of the intermediate heat exchanger 26 and downstream of the discharge unit 4 inside the hydro unit 36, and adjusts a flow rate of the heat medium flowing through the heat medium circuit 3. In other words, the outlet-side valve 8 is provided to a portion of the heat medium pipe 31 that is downstream of the discharge unit 4 in the heat medium circuit 3 and adjusts the flow rate of the heat medium flowing through the heat medium pipe 31. The outlet-side valve 8 may be a valve having an adjustable opening degree or a valve having a fixed opening degree. The inlet-side valve 9 is a valve that is provided to an inlet port of the intermediate heat exchanger 26 and upstream of the discharge unit 4, for example, is provided downstream of the pump 32, and adjusts the flow rate of the heat medium flowing through the heat medium circuit 3. In other words, the inlet-side valve 9 is provided to a portion of the heat medium pipe 31 that is upstream of the discharge unit 4 in the heat medium circuit 3, and adjusts the flow rate of the heat medium flowing through the heat medium pipe 31. The inlet-side valve 9 may be a valve having an adjustable opening degree, a valve having a fixed opening degree, or a check valve preventing backflow. Note that only one of the outlet-side valve 8 and the inlet-side valve 9 may be provided. In this case, installation of only the outlet-side valve 8 in the heat medium circuit 3 is higher in effect of preventing inflow of the refrigerant than installation of only the inlet-side valve 9 in the heat medium circuit 3.

In a case where the refrigerant flows into the heat medium circuit 3 of the air-conditioning device 100, the refrigerant is discharged from the discharge unit 4, and the refrigerant is detected by the refrigerant detection device 5 attached close to the discharge unit 4. When the refrigerant is detected by the refrigerant detection device 5, the controller 7 closes the outlet-side valve 8 and the inlet-side valve 9 in conjunction with detection of the refrigerant. More specifically, in a case where the refrigerant concentration detected by the refrigerant detection device 5 exceeds a valve-closing set value that is a preset threshold of the refrigerant concentration, the controller 7 closes the outlet-side valve 8. In addition, in the case where the refrigerant concentration detected by the refrigerant detection device 5 exceeds a valve-closing set value that is a preset threshold of the refrigerant concentration, the controller 7 closes the inlet-side valve 9. The valve-closing set value for closing the outlet-side valve 8 and the valve-closing set value for closing the inlet-side valve 9 may be the same as each other or different from each other. Further, the valve-closing set values may be the same as or different from the unit-side set value, the apparatus-side set value, or the discharge set value, described above, or other values. The valve-closing set value for closing the outlet-side valve 8 and the valve-closing set value for closing the inlet-side valve 9 are stored as the thresholds in the memory 72. The calculation unit 71 of the controller 7 refers to the refrigerant concentration detected by the refrigerant detection device 5 and the valve-closing set values stored in the memory 72, to determine whether the refrigerant concentration detected by the refrigerant detection device 5 exceeds the valve-closing set values. Although the controller 7 is disposed inside the hydro unit 36 in FIG. 4, the controller 7 may be disposed inside the heat source apparatus 20 or inside the heating and cooling apparatus 30.

In the case where the refrigerant flows into the heat medium circuit 3 of the air-conditioning device 100, the refrigerant passes through the heat medium pipe 31 from the intermediate heat exchanger 26, and is discharged from the discharge unit 4. At this time, even if all of the refrigerant is not discharged from the discharge unit 4, in the case where the outlet-side valve 8 is closed by the controller 7, the refrigerant does not advance over the outlet-side valve 8. Accordingly, the air-conditioning device 1 can surely prevent the refrigerant from flowing into a portion of the heat medium pipe 31 that is provided in the indoor space. Further, in the case where the refrigerant flows into the heat medium circuit 3, the refrigerant may flow back from the intermediate heat exchanger 26. In the case where the inlet-side valve 9 is closed by the controller 7, however, the refrigerant does not advance over the inlet-side valve 9, Accordingly, the air-conditioning device 1 can more surely prevent the refrigerant from flowing into a portion of the heat medium pipe 31 that is provided in the indoor space.

As described above, in the case where the refrigerant flows into the heat medium circuit 3, the air-conditioning device 100 according to Embodiment 2 can separate the heat medium circuit 3 into a portion that includes the heating and cooling apparatus 30 and a portion that mainly includes the hydro unit 36 by the outlet-side valve 8 and the inlet-side valve 9, Therefore, it is possible to prevent the refrigerant from passing through the heat medium circuit 3 and flowing into a portion of the heat medium pipe 31 that is provided in the indoor space where the heating and cooling apparatus 30 is disposed.

REFERENCE SIGNS LIST 1 air-conditioning device 2 refrigerant circuit 3 heat medium circuit 4 discharge unit 4a main body portion 5 refrigerant detection device 6 notification device 6a first notification device 6b second notification device 6c third notification device 7 controller 8 outlet-side valve 9 inlet-side valve 20 heat source apparatus 21 refrigerant pipe 22 compressor 23 flow switching device 24 heat source-side heat exchanger 25 expansion unit intermediate heat exchanger 30 heating and cooling apparatus 30a remote control 31 heat medium pipe 32 pump 33 load-side heat exchanger 34 air removal valve 36 hydro unit 37 exhaust device 41a connection end part 41b ejection end part 71 calculation unit 72 memory 73 clocking unit 100 air-conditioning device

The invention claimed is:

1. An air-conditioning device, comprising:
a refrigerant circuit including a compressor, a heat source-side heat exchanger, an expansion unit, and an intermediate heat exchanger that are connected by a refrigerant pipe, and through which refrigerant circulates, the heat source-side heat exchanger exchanging heat between air and the refrigerant, the intermediate heat exchanger exchanging heat between the refrigerant and a heat medium;
a heat medium circuit including a pump, the intermediate heat exchanger, and a load-side heat exchanger that are connected by a heat medium pipe, and through which the heat medium circulates, the load-side heat exchanger exchanging heat between air in an air-conditioned space and the heat medium;
a discharge unit connected downstream of the intermediate heat exchanger in the heat medium circuit and configured to discharge a fluid flowing through the heat medium pipe, to outside of the heat medium pipe, depending on a pressure of the fluid;
a refrigerant concentration detector configured to detect a concentration of the refrigerant contained in the fluid discharged from the discharge unit;
a notification device configured to notify leakage of the refrigerant; and
a controller configured to activate the notification device depending on the concentration of the refrigerant detected by the refrigerant concentration detector,
in a case where the concentration of the refrigerant detected by the refrigerant concentration detector exceeds a first stop set value that is a preset threshold of refrigerant concentration, the controller being configured to stop the pump,
in a case where, after a set time elapses, the concentration of the refrigerant detected by the refrigerant concentration detector is lower than or equal to a reoperation set value that is a preset threshold of refrigerant concentration, the controller being configured to activate the stopped pump.

2. The air-conditioning device of claim 1, wherein
the discharge unit includes a main body portion having a pipe shape, and
the main body portion includes a connection end part and an ejection end part, the connection end part being disposed at a position higher than or equal to the heat medium pipe in a vertical direction and having a connection port connected to the heat medium pipe, the ejection end part being disposed at a position higher than or equal to the connection end part in the vertical direction and having an ejection port through which the fluid is ejected to the outside of the heat medium pipe when pressure in the heat medium pipe is a prescribed pressure or more.

3. The air-conditioning device of claim 2, wherein, in a case where the refrigerant is lighter than air, the refrigerant concentration detector is disposed at a position higher than the ejection end part in the vertical direction.

4. The air-conditioning device of claim 2, wherein, in a case where the refrigerant is heavier than air, the refrigerant concentration detector is disposed at a position lower than the ejection end part in the vertical direction.

5. The air-conditioning device of claim 1, wherein the intermediate heat exchanger is a plate heat exchanger.

6. The air-conditioning device of claim 1, further comprising an outlet-side valve provided in a portion of the heat medium pipe that is downstream of the discharge unit in the heat medium circuit and configured to adjust a flow rate of the heat medium flowing through the heat medium pipe.

7. The air-conditioning device of claim 1, further comprising an inlet-side valve provided in a portion of the heat medium pipe that is upstream of the discharge unit in the heat medium circuit and configured to adjust a flow rate of the heat medium flowing through the heat medium pipe.

8. The air-conditioning device of claim 6, wherein, in a case where the concentration of the refrigerant detected by the refrigerant concentration detector exceeds a valve-closing set value that is a preset threshold of refrigerant concentration, the controller is configured to close the outlet-side valve.

9. The air-conditioning device of claim 7, wherein, in a case where the concentration of the refrigerant detected by the refrigerant concentration detector exceeds a valve-closing set value that is a preset threshold of refrigerant concentration, the controller is configured to close the inlet-side valve.

10. The air-conditioning device of claim 1, further comprising an exhaust device configured to discharge the fluid discharged from the discharge unit, to an outdoor space from a hydro unit in which the pump and the intermediate heat exchanger are disposed, wherein,
in a case where the concentration of the refrigerant detected by the refrigerant concentration detector exceeds a discharge set value that is a preset threshold of refrigerant concentration, the controller is configured to activate the exhaust device.

11. The air-conditioning device of claim 1, wherein
the notification device includes a first notification device inside a hydro unit in which the pump and the intermediate heat exchanger are disposed, and,
in a case where the concentration of the refrigerant detected by the refrigerant concentration detector exceeds a unit-side set value that is a preset threshold of refrigerant concentration, the controller is configured to control the first notification device such that the first notification device notifies leakage of the refrigerant.

12. The air-conditioning device of claim 1, wherein
the notification device includes a second notification device inside a heating and cooling apparatus in which the load-side heat exchanger is disposed, and,
in a case where the concentration of the refrigerant detected by the refrigerant concentration detector exceeds an apparatus-side set value that is a preset threshold of refrigerant concentration, the controller is configured to control the second notification device such that the second notification device is configured to notify a person in the air-conditioned space of leakage of the refrigerant.

13. The air-conditioning device of claim 1, wherein, in a case where the concentration of the refrigerant detected by the refrigerant concentration detector exceeds a second stop set value that is a preset threshold of refrigerant concentration, the controller is configured to stop the pump.

14. The air-conditioning device of claim 8, wherein the pump has a rated horsepower, and the preset threshold is set based on the horsepower of the pump.

15. The air-conditioning device of claim 11, wherein the notification device includes one or both of:
a first notification device inside a hydro unit in which the pump and the intermediate heat exchanger are disposed, wherein the first notification device is a first audible alarm, and
a second notification device inside a heating and cooling apparatus in which the load-side heat exchanger is disposed, wherein the second notification device is a second audible alarm, a visual alarm, or a warning lamp.

16. The air-conditioning device of claim 1, wherein
the notification device includes a first notification device inside a hydro unit in which the pump and the intermediate heat exchanger are disposed, the first notification device is an audible alarm, and
in a case where the concentration of the refrigerant detected by the refrigerant concentration detector exceeds a unit-side set value that is a preset threshold of refrigerant concentration, the controller is configured to control the first notification device such that the first notification device notifies leakage of the refrigerant.

17. The air-conditioning device of claim 1, wherein
the notification device includes a second notification device inside a heating and cooling apparatus in which the load-side heat exchanger is disposed, wherein the second notification device is an audible alarm, a visual alarm, or a warning lamp, and
in a case where the concentration of the refrigerant detected by the refrigerant concentration detector exceeds an apparatus-side set value that is a preset threshold of refrigerant concentration, the controller is configured to control the second notification device such that the second notification device is configured to notify a person in the air-conditioned space of leakage of the refrigerant.

\* \* \* \* \*